US007130891B2

(12) United States Patent
Bernardin et al.

(10) Patent No.: US 7,130,891 B2
(45) Date of Patent: Oct. 31, 2006

(54) SCORE-BASED SCHEDULING OF SERVICE REQUESTS IN A GRID SERVICES COMPUTING PLATFORM

(75) Inventors: James Bernardin, New York, NY (US); Peter Lee, New York, NY (US)

(73) Assignee: Datasynapse, Inc., New York, NY (US)

( * ) Notice: Subject to any disclaimer, the term of this patent is extended or adjusted under 35 U.S.C. 154(b) by 86 days.

(21) Appl. No.: 10/728,732

(22) Filed: Dec. 5, 2003

(65) Prior Publication Data

US 2005/0021594 A1 Jan. 27, 2005

Related U.S. Application Data

(63) Continuation-in-part of application No. 10/306,689, filed on Nov. 27, 2002, which is a continuation-in-part of application No. PCT/US02/03218, filed on Feb. 4, 2002.

(51) Int. Cl.
 *G06F 17/30* (2006.01)
(52) U.S. Cl. .................. 709/218; 709/228; 707/2; 707/10; 705/14
(58) Field of Classification Search .............. 709/203, 709/224, 228, 217, 218; 707/2, 4, 10; 711/133; 705/14
See application file for complete search history.

(56) References Cited

U.S. PATENT DOCUMENTS

| | | | | |
|---|---|---|---|---|
| 6,073,168 A * | 6/2000 | Mighdoll et al. | ............ | 709/217 |
| 6,195,680 B1 * | 2/2001 | Goldszmidt et al. | ........ | 709/203 |
| 6,338,628 B1 * | 1/2002 | Smith | ......................... | 434/236 |
| 2002/0138271 A1 * | 9/2002 | Shaw | ......................... | 704/270 |
| 2003/0059750 A1 * | 3/2003 | Bindler et al. | .............. | 434/236 |
| 2003/0212546 A1 * | 11/2003 | Shaw | ............................ | 704/9 |

* cited by examiner

*Primary Examiner*—Zarni Maung
*Assistant Examiner*—Nghi Tran
(74) *Attorney, Agent, or Firm*—Goodwin Procter LLP

(57) ABSTRACT

A service-oriented framework allows client applications to services hosted on a distributed computing access computational grid. Services facilitate remote, parallel execution of code in a way that is scalable, fault-tolerant, dynamic and language-independent. Services can be written in a variety of languages, and do not need to be compiled or linked with vendor-supplied code. A client written in one language can invoke a Service written in another. A benefit of the invention over traditional approaches is that it virtualizes the Service. Rather than send a request directly to the remote machine hosting the Service, a client request is sent to a manager, which enqueues until an Engine is available. The first Engine to dequeue the request hosts the Service. This mechanism, in which a single virtual Service instance (the client-side object) is implemented by one or more physical instances (Engine processes), provides for fault tolerance and essentially unlimited scalability.

34 Claims, 25 Drawing Sheets

```
public class Valuation {
    private java.util.Calendar valuationDate;
    private double value;
    private MarketData public Valuation() {
    } public java.util.Calendar getValuationDate() {
        return valuationDate;
    } public void setValuationDate(java.util.Calendar valuationDate) {
        this.valuationDate = valuationDate;
    } public double getValue() {
        return value;
    } public void setValue(double value) {
        this.value = value;
    }
}
```

FIGURE 2

```
[Serializable]
   public class Valuation {
       public DateTime valuationDate;
       public double value;
   }
```

<u>FIGURE 3</u>

```
/**
 * JavaDealValuatorProxy.java
 * This file was autogenerated by the DataSynapse GridServer Manager.
 *
 * Be careful when making modifications to this class or associated generated classes. *
 * If you change the package, you must also change the packages
 * passed into the setXmlBeanDiscovery() method in the proxy class accordingly.
 */
package examples.dealvaluator.client.java;

import com.datasynapse.gridserver.client.*;

public class JavaDealValuatorProxy extends ServiceBindingStub {
        /**
         * Constructor. Any arguments to the initMethod, if set, are passed into this constructor.
         * @throws GridServerException if there is a problem creating the service, such as when there is no registered service with this name
         */
        public JavaDealValuatorProxy(examples.dealvaluator.client.java.MarketData in0) throws Exception {
                super("JavaDealValuatorExample",new Object[] {in0}, null, null);
                String[] packages = new String[] {"examples.dealvaluator.client.java"};
                setXmlBeanDiscovery(packages,
                this.getClass().getClassLoader());
        }
        /**
         * Constructor. Any arguments to the initMethod, if set, are passed into this constructor.
         * @param options Additional service options. These options cannot override the options registered for this service
         * @param description Service description. These values cannot override the values registered for this service
         * @throws GridServerException if there is a problem creating the service, such as when there is no registered service with this name
         */
        public JavaDealValuatorProxy(examples.dealvaluator.client.java.MarketData in0, java.util.Properties options,
java.util.Properties description) throws Exception {
                super("JavaDealValuatorExample",new Object[] {in0}, options, description);
                String[] packages = new String[] {"examples.dealvaluator.client.java"};
                setXmlBeanDiscovery(packages, this.getClass().getClassLoader());
        }
```

FIGURE 4A

```
/**
 * Updates the state of the service instance by calling setMarketData
 * on any Engine prior to executing a request
 * @throws ServiceException if there is a problem with the service, such as it being cancelled or not started
 * @throws GridServerException on any other error
 */
public void setMarketData(examples.dealvaluator.client.java.MarketData in0) throws Exception {
        updateState("setMarketData", new Object[] {in0}, false);
}
/**
 * Synchronously calls valueOne
 * @return the result of the call
 * @throws ServiceInvocationException on an error executing the request
 * @throws ServiceException if there is a problem with the service, such as it being cancelled or not started
 * @throws GridServerException on any other error
 */
public examples.dealvaluator.client.java.Valuation valueOne(examples.dealvaluator.client.java.Deal in0,
java.util.Calendar in1) throws Exception {
        return (examples.dealvaluator.client.java.Valuation)execute("valueOne", new Object[] {in0, in1});
}
/**
 * Submits an asynchronous request to valueOne
 * @param callback If set, the callback is called upon completion of the request
 * @return The id of the request
 * @throws ServiceException if there is a problem with the service, such as it being cancelled or not started
 * @throws GridServerException on any other error
 */
public int valueOne(examples.dealvaluator.client.java.Deal in0, java.util.Calendar in1, Callback callback) throws
Exception {
        return submit("valueOne", new Object[] {in0, in1}, callback);
}
/**
 * Synchronously calls valueMany
 * @return the result of the call
 * @throws ServiceInvocationException on an error executing the request
 * @throws ServiceException if there is a problem with the service, such as it being cancelled or not started
 * @throws GridServerException on any other error
 */
public examples.dealvaluator.client.java.Valuation[] valueMany(examples.dealvaluator.client.java.Deal[] in0,
java.util.Calendar in1) throws Exception {
        return (examples.dealvaluator.client.java.Valuation[])execute("valueMany", new Object[] {in0, in1});
}
```

FIGURE 4B

```
/**
 * Submits an asynchronous request to valueMany
 * @param callback If set, the callback is called upon completion of the request
 * @return The id of the request
 * @throws ServiceException if there is a problem with the service, such as it being cancelled or not started
 * @throws GridServerException on any other error
 */
public int valueMany(examples.dealvaluator.client.java.Deal[] in0, java.util.Calendar in1, Callback callback) throws Exception {
        return submit("valueMany", new Object[] {in0, in1}, callback);
}
/**
 * Convenience method for destroying this service instance.
 */
public void destroy() {
        super.destroy();
}
/**
 * Convenience method for waiting indefinitely until this service instance is inactive.
 * @throws InterruptedException if interrupted
 */
public void waitUntilInactive() throws InterruptedException {
        super.waitUntilInactive();
}
/**
 * Callback used for asynchronous execution
 */
public interface Callback extends ServiceBindingStub.AsyncCallback { public void handleResponse(
        Object response, int id);
        public void handleError(Exception e, int id);
    }
}
```

FIGURE 4C

```
using System;

/// This file was autogenerated by the GridServer Manager.
///
/// Be careful when making modifications to this class or associated generated classes.
///
/// All of the following classes must reamin within the same namespace.
///
namespace examples.dealvaluator.client.net {
        /// <summary>
        /// MarketData
        /// </summary>
        [Serializable]
        public class MarketData {
                public double rate;
        }
        /// <summary>
        /// Deal
        /// </summary>
        [Serializable]
        public class Deal {
                public string id;
                public int type;
                public double amount;
                public string data;
        }
        /// <summary>
        /// Valuation
        /// </summary>
        [Serializable]
        public class Valuation {
                public double val;
                public DateTime valuationDate;
        }
        /// <summary>
        /// NETDealValuatorProxy.cs
        /// </summary>
        public class NETDealValuatorProxy : DataSynapse.GridServer.Client.ServiceBindingStub {
                /// <summary>
                /// Constructor. Any arguments to the initMethod, if set, are passed into this constructor.
                /// </summary>
                public NETDealValuatorProxy(MarketData data) : base("NETDealValuatorExample", new object[] {data},
null, null, true) {}
                /// <summary>
                /// Constructor. Any arguments to the initMethod, if set, are passed into this constructor.
                /// </summary>
                /// <param name="options">Additional service options. These options cannot override the options registered for this service</param>
                /// <param name="description">Service description. These values cannot override the values registered for this service</param>
                /// <remarks>
```

FIGURE 5A

```
/// Becuase options and descriptions are GridServer specific,
/// this contructor is purposely commented out so that this class remains vendor-neutral
/// </remarks>
///
public NETDealValuatorProxy(MarketData data, DataSynapse.Util.Properties options,
    DataSynapse.Util.Properties description) : base("NETDealValuatorExample", new object[] {data}, options, description, true) {}
/// <summary>
/// Updates the state of the service instance by calling setMarketData
/// on any Engine prior to executing a request
/// </summary>
public void SetMarketData(MarketData data) {
        this.UpdateState("setMarketData", new object[] {data}, false);
}
/// <summary>
/// Synchronously calls valueOne
/// </summary>
/// <returns>the result of the call</returns>
public Valuation ValueOne(Deal deal, DateTime date) {
        object[] results = this.Invoke("valueOne", new object[] {deal, date});
        return (Valuation)results[0];
}
/// <summary>
/// Begins an asynchronous request to valueOne
/// </summary>
/// <param name="callback">If set, the callback is called upon completion of the request</param>
/// <param name="asyncState">The state object, which can be set to hold useful information which is passed into the result</param>
/// <returns>The result, which can be used to wait on the return.</returns>
public System.IAsyncResult BeginValueOne(Deal deal, DateTime date, System.AsyncCallback callback,
    System.Object asyncState) {
        return this.BeginInvoke("valueOne", new object[] {deal, date}, callback, asyncState);
}
/// <summary>
/// Ends an asynchronous request to valueOne to extract the result
/// </summary>
/// <param name="asyncResult">The result, passed into the callback and returned from the Begin call</param>
/// <returns>the result of the request</returns>
/// <remarks>
/// If called from the callback, the result is immediately returned.
/// If called immediately after the Begin call, this call blocks until completion.
/// If the request resulted in an error, the exception is thrown from this method.
/// </remarks>
public Valuation EndValueOne(System.IAsyncResult asyncResult) {
        object[] results = this.EndInvoke(asyncResult);
        return (Valuation)results[0];
}
```

FIGURE 5B

```csharp
/// <summary>
/// Synchronously calls valueMany
/// </summary>
/// <returns>the result of the call</returns>
public Valuation[] ValueMany(Deal[] deals, DateTime date) {
        object[] results = this.Invoke("valueMany", new object[] {deals, date});
        return (Valuation[])results[0];
}
/// <summary>
/// Begins an asynchronous request to valueMany
/// </summary>
/// <param name="callback">If set, the callback is called upon completion of the request</param>
/// <param name="asyncState">The state object, which can be set to hold useful information which is passed into the result</param>
/// <returns>The result, which can be used to wait on the return.</returns>
public System.IAsyncResult BeginValueMany(Deal[] deals, DateTime date, System.AsyncCallback callback, System.Object asyncState) {
        return this.BeginInvoke("valueMany", new object[] {deals, date}, callback, asyncState);
}
/// <summary>
/// Ends an asynchronous request to valueMany to extract the result
/// </summary>
/// <param name="asyncResult">The result, passed into the callback and returned from the Begin call</param>
/// <returns>the result of the request</returns>
/// <remarks>
/// If called from the callback, the result is immediately returned.
/// If called immediately after the Begin call, this call blocks until completion.
/// If the request resulted in an error, the exception is thrown from this method.
/// </remarks>
public Valuation[] EndValueMany(System.IAsyncResult asyncResult) {
        object[] results = this.EndInvoke(asyncResult);
        return (Valuation[])results[0];
}
/// <summary>
/// Convenience method for destroying this service instance.
/// </summary>
public void Destroy() {
        base.Destroy();
}
/// <summary>
/// Convenience method for waiting indefinitely until this service instance is inactive.
/// </summary>
public void WaitUntilInactive() {
        base.WaitUntilInactive();
}
    }
}
```

FIGURE 5C

```
package example.services.adder.service;

public class JavaAdder { public double add(double a, double b) {
                return a + b;
        }
}
```

FIGURE 6

```
// Create a Service instance of JavaAdderExample
Service s = ServiceFactory.getInstance().createService("JavaAdderExample");

// Perform Synchronous add
Object[] arguments = new Object[] { new Double(5), new Double(6) };
Double sum = (Double)s.execute("add", arguments);
System.out.println("Result of add: " + sum);
```

FIGURE 7

```java
// Handler for Service Clients
static class AdderHandler implements ServiceInvocationHandler {
        public void handleError(ServiceInvocationException e, int id) {
                System.out.println("Error from " + id + ": " + e);
        }
        public void handleResponse(Serializable response, int id) {
                System.out.println("Response from " + id + ": " + response);
                _total += ((Double)response).doubleValue();
        }
        public double getTotal() {
                return _total;
        }
        private double _total = 0;
}
```

FIGURE 8

```
// Perform Asynchronous adds
AdderHandler handler = new AdderHandler();
for (int i=0; i < 10; i++) {
        s.submit("add", new Object[] { new Double(i), new Double(i) }, handler);
}

// Wait until all the invocations have returned
s.waitUntilInactive(0);
System.out.println("Total: " + handler.getTotal());
```

FIGURE 9

```
// Create an instance of the Service Proxy
JavaAdderProxy adder = new JavaAdderProxy();

// Perform Synchronous add
double sum = adder.add(8.0, 10.0);
System.out.println("Result of Add: " + sum);
```

FIGURE 10

```
public double add(double in0, double in1) throws Exception {
        return ((java.lang.Double) execute("add", new Object[] {new java.lang.Double(in0), new java.lang.Double(in1)})).doubleValue();
}
```

FIGURE 11

```
public interface Callback extends ServiceBindingStub.AsyncCallback {
        public void handleResponse(Object response, int id);
        public void handleError(Exception e, int id);
}
```

FIGURE 12

```
// Perform Asynchronous adds
AdderCallback callback = new AdderCallback();
for (int i=0; i < 10; i++) {
        adder.add(i, i, callback);
}

// Wait until all the invocations have returned
adder.waitUntilInactive();
System.out.println("Total: " + callback.getTotal());
```

FIGURE 13

```
JavaAdderProxy proxy = new JavaAdderServiceLocator().getJavaAdderProxy();
((org.apache.axis.client.Stub)proxy).setUsername(username);
((org.apache.axis.client.Stub)proxy).setPassword(password);
((org.apache.axis.client.Stub)proxy).setMaintainSession(true);

// Perform Synchronous add
double sum = adder.add(8.0, 10.0);
System.out.println("Result of Add: " + sum);
```

FIGURE 14

```
private void submitAll(JavaAdderProxy proxy) throws Exception {
        int num = 10;
        for (int i = 0; i < num; i++) {
                String id = proxy.add_Async(i, i);
                System.out.println("Submitted ID: " + id);
        }
}
private void collectAll(JavaAdderProxy proxy) throws Exception {
        Object result = null;
        int num = 0;
        while (true) { // providing a null id indicates that any available result should be collected
                String id = null;
                StringHolder idHolder = new StringHolder(id);
                try {
                        result = proxy.collectAsync(idHolder);
                } catch (AxisFault ex1) {
                        if (ex1.getFaultCode().getLocalPart().equals("Client")) {
                        // Client types indicate an error executing the request on an Engine
                                System.out.println("Received result #"+ num++);
                                handleError(ex1);
                                continue;
                        } else {
                        // some other problem, such as unauthorized use, so just exit
                                throw ex1;
                        }
                }
                if (idHolder.value != null) { // if the returned id is set, then there is a result
                        System.out.println("Received result #"+ num++);
                        handleResult(result, idHolder.value);
                } else { // either nothing currently available, or nothing outstanding
                        if (result != null) {
                        // if outstanding requests, result is time to wait before next collection
                                Thread.currentThread().sleep( ( (Long) result).longValue());
                        } else { // if both id and result are null, no outstanding requests.
                                break;
                        }
                }
        }
}
```

FIGURE 15

```
public class DBCalculator { public void initDBConnection(Properties connProps, int someVal) {
        _connection = new Connection(Properties props);
    } public Bar calculate(String arg1, ...) { ... } public void close() {
        if (_connection != null)
            _connection.close();
    } private Connection _connection;
}
```

FIGURE 16

```
public class DBCalculatorProxy {
        public DBCalculatorProxy(Properties connProps, int someVal) { ... }
        ...
}
```

FIGURE 17

```
public class DBCalculator {
    ...
    public void stop() {
        _isStopped = true;
    }
    public Bar calculate(String arg1, ...) {
        while (_isStopped != null) {
            // iterate over looping variable
        }
    }
    private volatile boolean _isStopped = false;
}
```

FIGURE 18

```
public class BondValuationService {
        public void addBonds(String[] bondIds) {
                ...
        }
        public void setBonds (String[] bondIds) {
                ...
        }
        public ValuationResults valueAllBonds(Scenario s) {
                ...
        }
}
```

FIGURE 19

```
public class BondValuationServiceProxy {
        public void addBonds(String[] bondIds) {
                ...
        }
        public void setBonds (String[] bondIds) {
                ...
        }
        public ValuationResults valueAllBonds(Scenario s) {
                ...
        }
}
```

<u>FIGURE 20</u>

```
Service service = ServiceFactory.getInstance().createService("bondCalculator");

service.updateState("addBonds", new Object[] { bondIds }, false);
// or
service.updateState("setBonds", new Object[] { bondIds }, true);
```

FIGURE 21

SCORE-BASED SCHEDULING OF SERVICE REQUESTS IN A GRID SERVICES COMPUTING PLATFORM

CROSS-REFERENCE TO RELATED APPLICATION

This application is a continuation-in-part of U.S. patent application Ser. No. 10/306,689 filed Nov. 27, 2002, which is a CIP of PCT/US/02/03218 filed Feb. 4, 2002 entitled "Adaptive Scheduling," which is incorporated herein by reference.

FIELD OF THE INVENTION

The present invention relates generally to the field of grid computing and, more specifically, to methods and frameworks for providing computing services to clients using a distributed computational grid.

BACKGROUND OF THE INVENTION

Recent years have seen explosive growth in the field of grid computing. See, for example, Foster et al., "The Anatomy of the Grid: Enabling Virtual Scalable Organizations," Intl. J. of Supercomputer Applications (2001).

However, despite significant work in the research and commercial sectors, there remains substantial room for improvement of grid computing frameworks. Specifically, there exists a need for improvement in the mechanisms for translating or porting existing client-server applications to grid platforms without the need for extensive modification, and for grid platforms that can execute such ported client-server applications in an efficient, load-balanced, and fault-tolerant manner. The present invention addresses these, as well as other, needs.

SUMMARY OF THE INVENTION

The invention provides a service-oriented framework that allows client applications to access computational services hosted on a distributed computing grid. Services facilitate remote, parallel execution of code in a way that is scalable, fault-tolerant, dynamic and language-independent. Services can be written in a variety of languages, and do not need to be compiled or linked with vendor-supplied code. There are client-side APIs in Java, C++, and .NET, as well as a Web Services interface. A client written in one language can invoke a Service written in another.

The basic Service execution model is similar to that of other distributed programming solutions: method calls on the client are routed over the network, ultimately resulting in method calls on a remote machine, and return values make the reverse trip. A Service in this context simply refers to the code on the remote machine whose methods are being invoked. (We prefer the term request to call or invocation, partly because the operation may be either synchronous or asynchronous.)

Services are suitable for implementing parallel processing solutions in which a single computation is split into multiple, independent pieces whose results are combined. This is accomplished by dividing up the problem, submitting the individual requests asynchronously, then combining the results as they arrive. Services also work well for executing multiple, unrelated serial computations in parallel.

The chief benefit of the invention over traditional approaches is that it virtualizes the Service. Rather than send a request directly to the remote machine hosting the Service, a client request is sent to the GridServer Manager, which enqueues it until an Engine is available. The first Engine to dequeue the request hosts the Service. Subsequent requests may be routed to the same Engine or may result in a second Engine running the Service concurrently. This decision is based on how long the request has been waiting for service, and how much state related to the Service resides on the first Engine. If an Engine hosting a Service should fail, another will take its place. This mechanism, in which a single virtual Service instance (the client-side object) is implemented by one or more physical instances (Engine processes) provides for fault tolerance and essentially unlimited scalability.

Because a Service instance can be virtualized on a number of Engines, adjusting a field's value using a Service method will only adjust that value on the Engine that processed that request. Accordingly, one must use an updateState method to guarantee that all Engines will update the state. All methods that are used to update the state must be registered as such on the Service, either as one of the setStateMethods or appendStateMethods.

When an Engine processes a Service request, it first processes all update state calls that it has not yet processed, in the order in which they were called on the Service instance. These calls are made prior to the execution of the request.

Using the Service-Oriented integration approach typically involves six steps:

1. Writing the Service, or adapting existing code. A Service can be virtually any type of code file: a library (DLL or .so), a .NET assembly, a Java class, even an executable. No vendor code need be linked in, but the remotely callable methods of the Service may have to follow certain conventions to enable cross-language execution and to support stateful Services.
2. Deploying the Service. Code and other resources required by a Service must be accessible from all Engines. This can be accomplished via a shared file system or GridServer's file update mechanism.
3. Registering the Service. To make the Service visible to clients, it must be registered under a name, preferably using the GridServer Administration Tool.
4. Creating a Service instance. Client code creates or gets access to a Service before using it—no discovery or binding is required. Each Service instance may have its own state. Because of virtualization, a single Service instance may correspond to more than one physical instance of the Service, such as more than one Engine running the Service's code. Multiple asynchronous calls to a Service usually result in more than one engine creating and accessing those Services.
5. Making requests. The methods or functions of a Service instance can be called remotely, either synchronously or asynchronously.
6. Destroying the instance. Clients should destroy a Service instance when they are done with it, to free up resources.

In light of the above, generally speaking, and without intending to be limiting, one specific aspect of the invention relates to methods for providing computational services to a client using a grid-based distributed computing system, the system including a plurality of engines and at least one grid manager, the method comprising: deploying executable code corresponding one or more service(s) such that the engines can access the executable code; registering the service(s) with the manager; creating instance(s) of the service(s) that may be invoked by the client; and using one or more of the instance(s) to invoke one or more of the registered service(s), wherein invoking a service comprises: (i) communicating a service request to the manager; (ii) using the manager to assign the service request to an available engine; and (iii) executing code corresponding to the requested service on the assigned engine. Deploying executable code may involve storing the executable code on a shared file system accessible to the engines, or using a file update mechanism provided by the manager to distribute the executable code to the engines. Such a file update mechanism preferably distributes the executable code to the engines when the manager is idle. Creating an instance of a service may involve invoking a service creation method. Communicating a service request to the manager may involve a synchronous or asynchronous invocation, either through an API or a client-side proxy. Using the manager to assign the service request to an available engine preferably involves applying an adaptive scheduling algorithm to select an engine. Such an adaptive scheduling algorithm may select among competing engines requesting work from the manager. The adaptive scheduling algorithm may compute a neediness score for services with pending requests, where the neediness score is computed, at least in part, from one or more of: (i) a priority weight for the service, (ii) an amount of time that engines have spent running task(s) associated with the service, and/or (iii) an amount of time that the request for the service has spent waiting to be assigned. The adaptive scheduling algorithm may also compute affinity scores reflecting the affinities of available engines to requested services. Such affinity scores may be computed, at least in part, from information representing the amount of the requested service's state that is already present on each available engine. In applying the adaptive scheduling algorithm, requested service(s) may be first ranked according to neediness score(s), then assigned to engine(s) according to affinity score(s).

Again, generally speaking, and without intending to be limiting, another aspect of the invention relates to methods for providing a client with a flexible, service-oriented computing environment using a computing grid, and comprising, for example, the following: invoking a grid manager to create client-side instances of stateless services; invoking the grid manager to create client-side instances of stateful services; using one or more of the client-side instances to invoke stateless services on one or more manager-assigned engines; and using one or more of the client-side instances to invoke stateful services on one or more manager-assigned engines. Invoking a grid manager to create client-side instances of stateless services may involve invoking a service creation method, and may further involve creating proxy objects associated with the stateless services. Invoking a grid manager to create client-side instances of stateful services may involve invoking a service creation method. Using one or more of the client-side instances to invoke a stateful service on one or more manager-assigned engines may further involve associating a state update method with the invoked service instance, where the a state update may comprise an append state method or a set state method. Invoking a grid manager to create client-side instances of stateful services may involve creating proxy objects associated with the stateful services, and may further involve implementing one or more asynchronous callback interface(s) associated with the proxy objects by providing, for example, response and/or error handling method(s). Creating proxy objects associated with the stateful services may further involve designating stateful methods as append state methods or set state methods.

Once again, generally speaking, and without intending to be limiting, another aspect of the invention relates to methods of deploying and invoking a stateful service on a grid computing platform by, for example, the following: deploying service code so as to be accessible to engines in the grid computing platform; generating a service proxy corresponding to the deployed service code; configuring the proxy to include state update information for each stateful method associated with the service code; and using the proxy to synchronously and/or asynchronously invoke stateful methods associated with the service code, whereby the proxy's state update information is used, as needed, to maintain coherent state information between nodes of the grid computing platform. Configuring the proxy to include state update information for each stateful method associated with the service code comprises designating each stateful method as an (i) append state method or a (ii) set state method.

While the above discussion outlines some of the important features and advantages of the invention, those skilled in the art will recognize that the invention contains numerous other novel features and advantages, as described below in connection with applicants' preferred GridServer embodiment.

Accordingly, still further aspects of the present invention relate to other system configurations, methods, software, encoded articles-of-manufacture and/or electronic data signals comprised of, or produced in accordance with, the above in combination with portions of the preferred GridServer embodiment, described in detail below.

BRIEF DESCRIPTION OF THE FIGURES

The present invention will be best appreciated by reference to the following set of figures (to be considered in combination with the associated detailed description below) in which:

FIGS. 2–3, 4A–C, 5A–C, and 6–21 contain exemplary code samples from applicants' preferred GridServer embodiment.

DESCRIPTION OF THE PREFERRED EMBODIMENT

Figure 1:
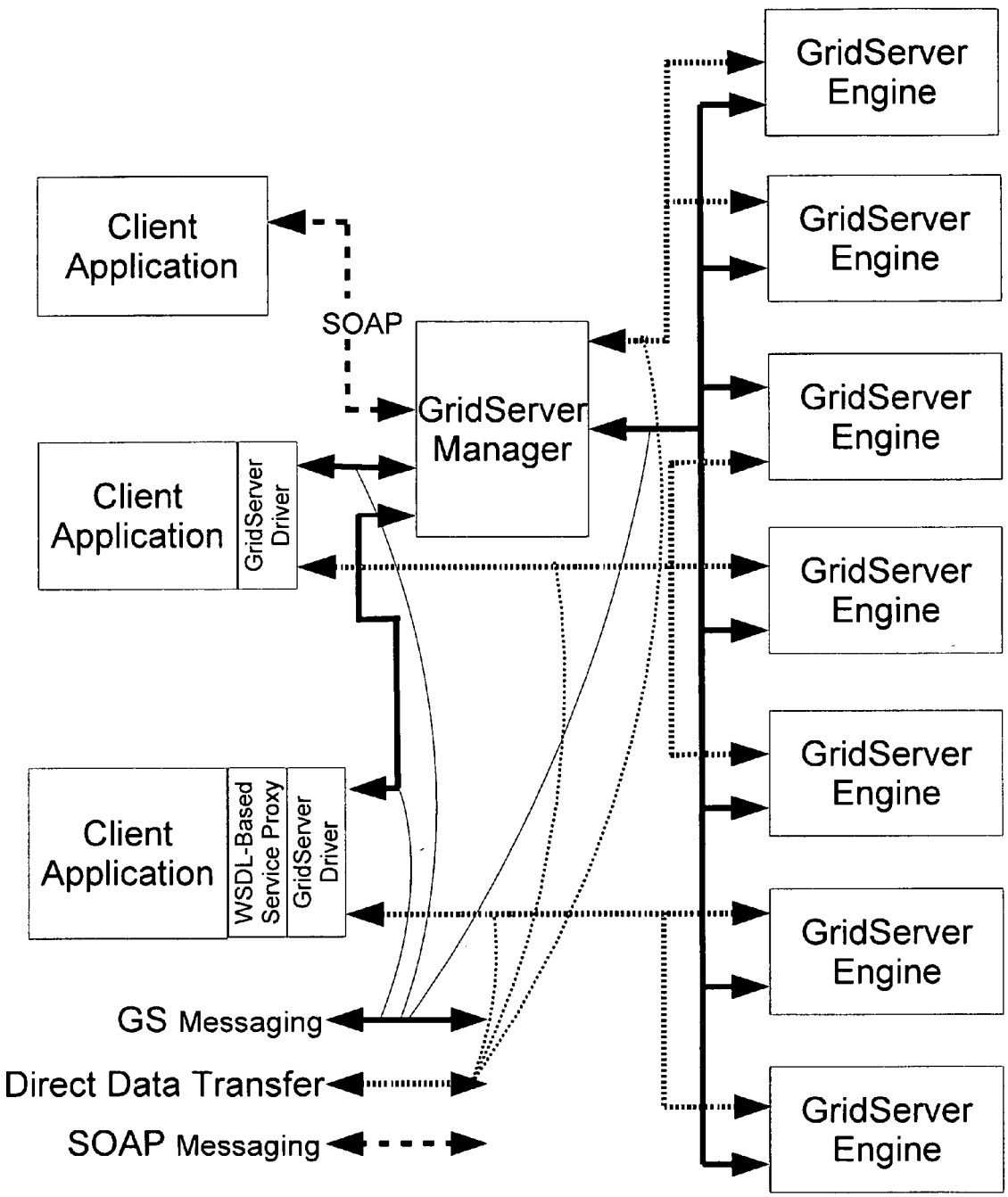
FIG. 1 shows an overview of the GridServer platform.

The services framework and methods of the invention are described in connection with their preferred implementation on the GridServer platform. Thus, we begin with a summary description of the GridServer platform.

GridServer is a distributed computing platform. It creates a virtual, fault-tolerant pool of compute resources over existing hardware and network infrastructure. GridServer is used to distribute compute-intensive, data-intensive, or throughput-intensive applications over this pool of resources in order to achieve increased performance and reliability by dividing large workloads into smaller tasks and distributing the work across the grid.

Referring now to FIG. 1, GridServer incorporates three main grid components, Drivers, Engines and Managers. Drivers serve client applications and act as agents for the client application to the GridServer Managers. Engines are the compute resources that the Manager uses to accomplish work requested from the grid by client applications. Managers are the controlling mechanism for the grid, scheduling work, managing state, and monitoring grid components.

GridServer supports a simple but powerful model for distributed parallel processing, a demand-based or polling model. The GridServer model works as follows:

A. Client applications (via Drivers) submit messages with work requests to a central Manager.
B. Engines report to the Manager when they are available for work.
C. The Manager assigns an individual unit of work to the Engine.
D. The Engine notifies the Manager when it has completed the unit of work.
E. Drivers poll the Manager for completed work units.
F. Drivers pull work unit results directly from the Engines (when direct data transfer mode is on).

Because some of the controlling logic of the grid is localized in the Drivers and Engines, the GridServer model is extremely adaptive. Scheduling (assigning work to Engines) is optimized because as each processor completes its work, it requests additional work. Faster processors request more work, speeding overall results in a "Darwinian" fashion. The demand-based model also supports scaling the grid. As additional compute capacity is needed and acquired, additional processors can be added to the compute pool.

The newly added Engines report for work to the Manager in the same way as existing Engines; for the Manager there is no difference. Finally, GridServer's demand-based architecture supports fault tolerance. When idle compute resources fail, they simply do not report for work.

The core GridServer components are implemented in Java, and the default inter-component communication protocol is HTTP. The components are designed to support interoperation across both wide area networks (WANs) and local area networks (LANs). Configurable settings govern message encryption and the underlying transport protocol.

Drivers

Drivers act as agents for client applications requesting work from the grid. They support the interface between client applications and the GridServer Manager. Depending on the requirements of the client application, Drivers can submit requests for work, collect results, and manage failover. Client applications that integrate with GridServer on the API level embed an instance of a Driver in the application code. GridServer launches a Driver on behalf of client applications, such as Web Services clients, that interact directly with the GridServer Manager.

Engines

Engines are the compute resources that GridServer uses to perform work. GridServer Engines can be installed on a wide range of hardware configurations including desktop computers, workstations, and dedicated servers. A single GridServer deployment can incorporate Engines on multiple operating systems and with various hardware configurations. Typically, one Engine runs on each processor participating in the grid; for example, four Engines running on a four-processor symmetric multi-processor (SMP) machine.

GridServer Engines report to the Manager when they are available for work. After logging in and updating code, they accept work assignments, run tasks, and notify the Manager when results are ready. An important feature of the Grid-Server platform is that it provides guaranteed execution over networks of interruptible Engines, making it possible to use intermittently active compute resources when they would otherwise remain idle.

A GridServer Engine launches when it determines that sufficient system capacity is available and relinquishes the processor immediately when it is interrupted (for example, by keyboard input on a desktop computer). The idle-detection algorithm is configurable, based on free memory, processor activity, network traffic, and user interface events. Inactive Engines occupy approximately one megabyte of memory and consume no processor cycles. It is also possible to launch a GridServer Engine deterministically, so they run in competition with other processes (and with each another, if more than one is running on the same processor) as scheduled by the operating system. This mode is useful both for testing and for installing Engines on dedicated processors.

Each GridServer Engine installation consists of one Engine Daemon and one or more Engine Instances. The Engine Daemon runs natively on the computer and is responsible for idle detection, managing the Engine Instances' runtime environment including code updates and file updating, launching Engine Instances, maintaining connectivity with the Manager's Director, and terminating Engine Instances upon interruption. Engine Instances run within the GridServer runtime environment managed by the Engine Daemon. Engine Instances report to the Manager's Broker for work, perform the client application's tasks, maintain connectivity with the Manager's Broker, and report the availability of work results. Communication between the Engine Daemon and the Engine Instances is purely through the host computer's operating system.

Managers

The GridServer Manager is the controlling mechanism of the grid. A GridServer Manager consists of a Director, a Broker, or both. Directors route Engines and Drivers to Brokers, and manage Brokers and Engine Daemons. Directors balance the load among their Brokers and provide Broker fault tolerance. Brokers schedule work and manage state. Brokers monitor Engine Instances and re-queue work assigned to failed Engines. Brokers also maintain connectivity to Drivers and coordinate providing results to client applications. They also provide a virtual end point for Web Services. By default, Engines and Drivers exchange data directly, and communicate with the Manager only for lightweight transaction messages. The GridServer architecture combines the central control of a hub and spoke architecture with the efficient communication of a peer-to-peer architecture.

Services

GridServer supports two methods of dividing and processing work, Services and Jobs. Both of these models can be used to take a large data intensive or compute-intensive problem and logically break it down into units of work that can run independently and combine for a final result. Grid-Server receives the work unit requests deterministically, one after the other, and services the requests in parallel. Additionally, high throughput applications or services can be distributed to a grid. Then, many similar requests for that service can be fulfilled as they arrive. Each request for service is independent, may be stateful, and generally arrives unpredictably at different points in time.

Both Service and Job requests for work can be broken down into individual units of work called Tasks. (The execution of a Task within a Service is also referred to as a Service Invocation.) A Task is an atomic unit of work that runs on an Engine.

Services also provide a language-independent interface to the GridServer platform. The language-specific Job API can be used to leverage existing Java or C++ development resources.

There are several ways for client applications to request work from GridServer:

(1) API-level Integration
  In Java, the Driver (called JDriver) exists as a set of classes within a JAR file. The client code submits work and administrative commands and retrieves computational results and status information through a simple API.

In C++, the Driver (called CPPDriver) is purely native, and exists as a set of classes within a DLL used by the application.

.NET also has a Driver (called DNDriver) that is purely native and exists as a set of classes within a .NET Assembly used by the application.

(2) Binary-level Integration

Another native Driver, PDriver, enables one to execute command-line programs as a parallel processing Job without using the API.

Any DLL, so, or binary executable can be registered as a Service. Integration as a Service in most cases requires no changes to client application code.

Services can be constructed using any of the following:
1. Arbitrary Java classes;
2. Arbitrary .NET classes;
3. Dynamic Library—(.so, .dll) with methods that conform to a simple input-output string interface; or,
4. Command—a script or binary.

Services can be accessed in one of three ways:
1. Service API—a client-side API, written in Java, COM, C++, or .NET;
2. Service Proxy—GridServer-generated C# or Java client stubs; or,
3. SOAP.

Any public Java or .NET class with a public, no-argument constructor can be made into a Service without modification. Each public method of the class can be accessed remotely through a Service operation. The input and output arguments must be either Serializable objects, support setter-getter interfaces in Java (beans) or public data members in .NET, or be pure strings—accessible as String in Java, string in .NET, std::string in C++, or (char*, int) in C. A dynamic library can be made into a Service if the functions exported as Service operations follow a simple string interface convention. The characteristics of each argument calling type are:

Serializable—Client and Services can talk rich objects with serialization being accomplished through proprietary .NET and Java data protocols. This is the simplest and most efficient way of exchanging data, but disallows interoperability between languages; for example, Java clients can only talk to Java Services and .NET clients can only talk to .NET Services.

XML Serializable—If the argument supports setter-getter methods in Java or the .NET class has public members, GridServer can automatically serialize these objects in an XML data format. This approach allows .NET and Java Services to inter-operate.

Strings—This approach allows for maximum interoperability among clients and Services implemented in different languages. For example, .NET clients can talk to Java or C++/C Services, and so on.

Service Method Compliance and Calling Conventions

Although Service methods need not link to vendor libraries, they must comply with a set of rules so that they may be used properly.

In the present embodiment, Java/.NET Services must adhere to the following conventions:

The Service class must be public.

Any method (service, state, cancel, destroy) must be public.

If a method takes no arguments, it can only be called with a null object, an empty string, or an empty byte array.

If a service method has a void return, it will return null. If any non-service method returns a value, it will be ignored.

If a service method takes only one argument, and that argument is a string, it can be called with a byte array, which will be properly converted. The reverse also applies: If a method takes a byte array, a string may be passed as the argument, and it will be converted.

Only strings and byte arrays may be used as parameters if called by a Driver of a different language. If the Service is called by a Driver of the same language, the parameters may be any public serializable object. Objects may also be passed between Java and .NET, as long as they are interop types and XML Serialization is used.

Primitive types are converted to their object equivalents automatically. For example, a service method that returns a double will return a Double on the client.

Overloaded methods are not allowed.

Methods can throw exceptions within a Service, which will capture and include stack trace data.

If a Service will be used as a Distributed Web Service, and a method has a throws clause, it must be throws Exception, because the WSDL generator can only handle the Exception class. One may still throw any descendant of Exception.

C++ Services must adhere to the following conventions:

Any method must be public.

If a method takes no arguments, it can only be called with a null object, an empty string, or an empty byte array.

If a service method has a void return, it will return null. If any non-service method returns a value, it will be ignored.

If a service method takes only one argument, and that argument is a string, it can be called with a byte array, which will be properly converted. The reverse also applies: If a method takes a byte array, a string may be passed as the argument, and it will be converted.

Only strings and byte arrays may be used as parameters.

Overloaded methods are not allowed.

Because a C++ invocation always returns a String, the returned type of an invocation must be converted to a String or byte[ ] based on a best effort guess. This guess is based on the first argument to the invocation; If a string is passed in as the first argument, it will return a string, and if it is passed a byte[ ], it will convert the string to a byte[ ]. If there are no arguments, it will return a byte[ ]. This is most relevant for a .NET or SOAP client, as string I/O must be ASCII. If returning binary data, one must make sure that the first argument is a byte[ ].

And Command Services must adhere to the following conventions:

The name of the method that is called is appended to the command line.

Argument values are piped into stdin or the input file. If there is more than one argument, the data is separated by the argDelimiter, which can be registered on the Service.

If a command spawns subprocesses, it must cancel them if the main command is cancelled.

Container Binding. Every Service has an associated Container Binding, which binds the Service implementation (the code) to the Container of the Service (the Engine). The container binding essentially describes how the implementation is to be used.

The binding contains the following fields:

| Field | Description |
| --- | --- |
| initMethod | The optional method, called when a Service instance is first used on an Engine. It is called prior to any Service or update methods. |
| destroyMethod | The optional method, called when a Service instance is destroyed. |
| cancelMethod | User-defined cancelled method. Called when the invocation is cancelled if KILL_CANCELLED_TASKS is false for this job, and is intended to interrupt the invocation. |
| serviceMethods | Methods that will perform a request and return a response. These are the actual methods that perform the calculations. The * character can be used to denote all methods that are not bound to any other action. |
| appendStateMethods | Methods that update state, appending to previous updates. |
| setStateMethods | Methods that update state, and flush the list of previous updates. |

All methods used must be bound to one of these fields. Additionally, the binding also contains the following:

| Field | Description |
| --- | --- |
| xmlSerialization | Whether XML serialization is used to serialize objects. If true, it allows .NET/Java cross-platform usage, and the client does not need the original deployed classes, since they are automatically generated. However, it requires that all classes are the defined interoperable (interop) types. If false, the classes can be any serializable class, and the client must link to the deployed classes, since they cannot be generated. Also, complex type values cannot be circular references; that is, an object cannot contain an object that contains this object. |
| TargetPackage | The package (Java) or namespace (.NET) into which the generated proxy classes will be placed. If not set, the name of the Service is used. |

Interop Types

When using XML Serialization on a .NET or Java Service, or when such a Service will be accessed via the Distributed Web Service interface, the parameters and return types must be interoperable, or interop, types. These types are the generally accepted SOAP interop types, and are as follows:

Primitives: byte, byte[ ], double, float, short, int, long, string, Calendar (Java) or DateTime (.NET).

Arrays: The type may be an array of any interop type.

Beans: In .NET, an interop type can be a serializable class that has public fields that are any interop types. In Java, it can be a Java Bean, which is a class that has public get/set methods for interop types.

Examples of Java and .NET interop types are shown in FIGS. 2–3, respectively.

Fault Tolerance

GridServer can provide a fault-tolerant and resilient distributed computing platform. The GridServer platform can recover from a component failure and thus guarantees the execution of Services over a distributed computing grid with diverse, intermittent compute resources. We will next describe how GridServer behaves in the event of Engine, Driver, and Manager failure. Failures of components within the grid can happen for a number of reasons, such as power outage, network failure, or interruptions by end users. For the purposes of this discussion, failure means any event that causes grid components to be unable to communicate with each other.

Fault-tolerant GridServer Deployment

A typical GridServer deployment consists of a primary Director, an optional secondary Director, and one or more Brokers. Drivers and Engines log into the Director, which routes them to one of the Brokers. Directors balance the load among their Brokers by routing Drivers and Engines to currently running Brokers.

A minimal fault-tolerant GridServer deployment contains two Directors, a primary and a secondary, and at least two Brokers. The Brokers, Engines and Drivers in the grid have the network locations of both the primary and the secondary Directors. During normal operation, the Engines and Drivers log into their primary Director; the secondary Director is completely idle.

Heartbeats and Failure Detection

Lightweight network communications sent at regular intervals, called heartbeats, are sent between GridServer components, such as from Drivers to Brokers, from Engine Instances to Brokers, and from Engine Daemons to Directors. A Manager detects Driver and Engine failure when it does not receive a heartbeat within the (configurable) heartbeat interval time. Drivers detect Broker failure by failing to connect when they submit Jobs or poll for results. Engines detect Broker failure when they report for work or when they return results.

Engine Failure

Network connection loss, hardware failure, or errant application code can cause Engine failure. When an Engine goes offline, the work assigned to it is requeued, and will be assigned to another Engine. Work done on the failed Engine is lost; the Task will start from the beginning when it is assigned to a new Engine. However, this can be avoided by using the Engine Checkpointing mechanism. Each Engine has a checkpoint directory where a task can save intermediate results. If an Engine fails and the Manager retains access to the Engine machine's file system, a new Engine will copy the checkpoint directory from the failed Engine.

Driver Failure

When a client application fails, the grid can detect the failure because the Driver sends heartbeats to its Broker. If the Broker detects that an application has failed during a Job, the Broker will terminate the Job if the Job's Collection type specified that the Driver is collecting the Job's results, otherwise the Broker takes no action. If this happens, application failure recovery and/or restart is the responsibility of the application.

Director Failure

If the primary Director fails, the secondary Director takes over routing Drivers and Engines to the Brokers. Since the Directors do not maintain any state, no work is lost if a Director fails and is restarted. Also, because both Directors follow the same rules for routing to Brokers, it makes no difference which Director is used for login.

The Primary Director is also responsible for an Administrative Database, which contains data needed by the grid for operation, such as the User list, routing properties, and so on. These values, then, can only be modified on the Primary Director. This database is backed up the Secondary Director on every database backup, so that the grid can remain in operation when the Primary Director is down.

Broker Failure

Like the Director, the Broker is designed as a robust application that will run indefinitely, and will typically only fail in the event of a hardware failure, power outage, or network failure. However, the fault-tolerance built into the Drivers guarantees that all Services will complete even in the event of failure.

Because the most likely reason that a Driver will be disconnected from its Broker is a temporary network outage, the Driver does not immediately attempt to log in to another Broker. Instead, it waits a configurable amount of time to reconnect to the Broker to which it was connected. After this amount of time, it will then attempt to log in to any available Broker. This amount of time is specified in the driver.properties file, located in the config directory of the GridServer SDK, and can be changed by editing the value of DSBrokerTimeout.

Once the Driver has timed out and reconnected to another Broker, all Service instances will then resubmit any outstanding tasks and continue. Tasks that are already complete will not be resubmitted. The Service instances will also resubmit all state updates in the order in which they were originally made. From the Service instance point of view, there will be no indication of error, such as exceptions or failure, just the absence of any activity during the time in which the Driver is disconnected. That is, all Services will run successfully to completion as long as eventually a suitable Broker is brought online.

If an Engine is disconnected from its Broker, the process simply shuts down, restarts, and logs in to any suitable Broker. Any work is discarded.

Failover Brokers

In the fault-tolerant configuration, some Brokers can be set up as Failover Brokers. When a Driver logs in to a Director, the Director will first attempt to route it to a non-Failover Broker, using the normal weighting and routing properties. If no non-Failover Brokers are available, the Director will consider all Brokers, which would typically then route the Driver to a Failover Broker.

A Failover Broker is not considered for Engine routing if there are no active Services on that Broker. Otherwise, it is considered like any other Broker, and follows Engine Sharing, Discrimination, and Weighting rules like any other Broker. By virtue of these rules, if a Failover Broker becomes idle, Engine will be routed back to other Brokers.

The primary Director monitors the state of all Brokers on the grid. If a Driver logged into a Failover Broker is able to log in to a non-Failover Broker, it will be logged off so it can return to the non-Failover Broker. All running Services will be continued on the new Broker by auto-resubmission.

By default, all Brokers are non-Failover Brokers. Designate one or more Brokers within the grid as Failover Brokers in order to keep those Brokers idle during normal operation.

Data Movement Mechanisms

GridServer has a number of features that distribute data to Engines while ensuring that a failed Engine does not take a piece of crucial data down with it.

Service Request Argument and Return Value

The most direct way to transmit data between Driver and Engine is via the argument to a Service request and the return value from that request (task input and task output, in the job/tasklet terminology). If Direct Data Transfer is enabled, the data will travel directly between Driver and Engine (see FIG. 1, showing direct data transfer paths).

Although each request is handled efficiently, the aggregate data transfer across hundreds of requests can be considerable. Thus any data that is common to all requests should be factored out into instance state or tasklet data, or distributed via some other mechanism.

Service Instance State

Any Service instance can have state associated with it. This state is stored on the Driver as well as on each Engine hosting the instance, so it is fault-tolerant with respect to Engine failure. (In the terminology of jobs and tasklets, Service instance state is tasklet state.) Service instance state is ideal for data that is specific to an instance and does not vary with each request. Service instance state is easy to work with, because it fits the standard object-oriented programming model. Like LiveCache, Service instance state is downloaded only once per Engine. Unlike LiveCache, however, the data is downloaded directly from the Driver, rather than the Manager, so Service instance state results in less data movement than LiveCache.

This peer-to-peer data transmission from Driver to Engine is GridServer's Direct Data Transfer feature, enabled by default. When Direct Data Transfer is enabled and a Service creation or Service request is initiated on a Driver, the initialization data or request argument is kept on the Driver and only a URL is sent to the Manager. When an Engine receives the request, it downloads the data directly from the Driver. This mechanism saves one network trip for the data and can result in significant performance improvements when the data is much larger than the URL that points to it, as is usually the case. It also greatly reduces the load on the Manager, improving Manager throughput and robustness.

Resource Update

GridServer's Resource Update mechanism will replicate the contents of a directory on the Manager to a corresponding directory on each Engine. Using Resource Update involves using the Resource Deployment page in the GridServer Administration tool to upload files to the Manager. One can also drop the files to distribute into a directory on the Manager. Once all currently running Services have finished, the Engines will download the new files.

Resource Update is the best way to guarantee that the same file will be on the hard disk of every Engine in the grid. File Update is ideal for distributing application code, but it is also a good way to deliver data to Engines before one's computation starts. Any kind of data that changes infrequently, like historical data, is a good candidate for distribution in this fashion.

LiveCache

GridServer's LiveCache feature consists of a disk-based repository on the Manager that is aggressively cached by clients (Drivers and Engines). The repository is organized as a set of catalogs, each of which is a map from string keys to arbitrary values. The LiveCache API (which exists for both Java and C++) supports putting, getting and removing key-value pairs and getting a list of all keys in a catalog. The Java API allows putting and getting of both serializable objects and streams.

A LiveCache client caches every value that it gets or puts. (A client can control whether caching is enabled, and if so whether the cache is in memory or on disk, on a per-catalog basis.) If a client changes a key's value or removes it, the Manager asks all clients to invalidate their cached copy of that key's value.

LiveCache is fault-tolerant with respect to Engine failure, because the data is stored on the Manager. When an Engine fails, its cached data is lost and its task is rescheduled. The Engine that picks up the rescheduled task will gradually build up its cache as it gets data from the Manager. There is a performance hiccup, but no loss of data.

LiveCache is a flexible and efficient way for Engines and Drivers to share data. Like File Update, an Engine needs only a single download to obtain a piece of constant data. Unlike File Update, LiveCache supports data that changes over the life of a computation.

LiveCache can also be used for Engines to post results. This is most useful if the results are to be used as inputs to subsequent computations.

Data Set

The GridServer Data Set feature, available only through the Job/Tasklet API, allows multiple jobs to share the same task inputs while minimizing the transmission of task inputs to Engines. First, a data set is created that contains the data, divided into task inputs. Then several jobs that reference the Data Set are created and run. When an Engine takes a task from a job keyed to a Data Set, it is given a task that matches a task input it has already downloaded, if any. State that is particular to the job is stored in the job's tasklet.

A Data Set acts like a distributed cache, with portions of the data residing on a number of Engines. If an Engine fails, its cache is lost, but another Engine will take over and download the necessary portions of the data. This sounds similar to LiveCache, but is superior at reducing data movement. Both mechanisms cache data on Engines, but with a Data Set, Engines prefer to take tasks whose data they have already downloaded. This cooperation between Engine and Manager is not attainable with LiveCache.

A disadvantage of Data Set is that it works only for input data. LiveCache can be used for both input and output.

Maintaining State

To maintain state on a Service, one would typically use a field or set of fields in an object to maintain that state. Because a Service instance can be virtualized on a number of Engines, adjusting a field's value using a Service method will only adjust that value on the Engine that processed that request. Instead, one must use the updateState method to guarantee that all Engines will update the state. All methods that are used to update the state must be registered as such on the Service, either as one of the setStateMethods or appendStateMethods.

When an Engine processes a Service request, it first processes all update state calls that it has not yet processed, in the order in which they were called on the Service instance. These calls are made prior to the execution of the request. The append value is used to determine whether previous update calls should be made. If append is false (a set), all previous update calls are ignored. If append is true, all calls starting from the last set call will be performed. Typically, then, append calls would be used to update a subset of the state, whereas a set call would refresh the entire state. If the Service instance is intended to be a long running state with frequent updates, one should on a regular basis use a set call so that Engines just coming online do not need to perform a long set of updates the first time they work on this Service instance.

Initialization

The initMethod is typically used to initialize the state on a Service that maintains state. It may be also used for other purposes on a stateless Service, such as establishing a database connection. The initMethod is called with the initData the first time an Engine processes a request on a Service instance. It is called prior to any update state calls.

Cancellation

A request may be cancelled for a number of reasons. It can be directly cancelled by the Admin interface or Administration Tool, it will be cancelled if the Service instance is cancelled, or, if redundant rescheduling is enabled, it will be cancelled if another engine processes the same request. If the killCancelledTasks option is true for this Service, the Engine process will simply exit, and the Engine will restart. However, in many cases it is not necessary to do so, and one would prefer to simply interrupt the calculation so that the Engine becomes immediately available.

In this case, the killCancelledTasks option should be false, and a cancelMethod should be implemented and registered on this Service. This method should be able to interrupt any Service method that is in process. It is also possible for the cancelMethod to be called after the service method has finished processing, so the implementor must take this into account.

If a request is cancelled due to the Service being cancelled, the cancelMethod will be called prior to the destroyMethod.

Destruction

Often times a Service will need to perform some cleanup on the Engine when the instance is destroyed, such as closing a database connection. If so, a destroyMethod should be implemented and registered on the Service. This method will be called whenever a Service instance is destroyed. It will also be called on any active Service instances on an Engine whenever an Engine shuts down.

Service Instance Caching

Engines maintain a cache of all Service instances that are currently active on that Engine. If an Engine is working on too many instances, an instance may be pushed out of the cache. In this case, the destroyMethod is called, and it is as if the Engine has not yet worked on that Service. That is, if it processes a subsequent request, it will initialize and update as if it were the first time it worked on that instance.

Shared Services

A Shared Service is an instance of a Service that is shared by Drivers executing on different processes or machines. When a Service is Shared, it means that the state of the Service is maintained across the Driver boundary. A Globally Shared Service Instance is a shared Service that can have only one instance for the Manager.

A Shared Service is created when a Service is created with the SHARED_SERVICE_NAME option specified. Any client attempting to create a Service with the same name and the same Shared Service name will simply attach to the already created Service. All clients sharing the shared instance will share the same Service ID. Note that one cannot use any init data when creating a Shared Service.

When the client cancels the Service instance, it only cancels the tasks submitted by that client. The Service can only be cancelled by the admin page or interface. The Shared Service becomes inactive when the last client detaches from the Service. The Service will be closed if the SHARED_SERVICE_INACTIVITY_KEEP_ALIVE_TIME is 0 or not set. Also, note that when using Shared Services, Engine state is not maintained in failover, unless all Drivers that updated state are still running the instance.

Service Groups

Services can be collected together in a group to aid in administrative tasks. A convenience class called ServiceGroup is provided in the API, which allows one to create a Service Group and later create new instances of Services within the Service Group. Each new Service instance created within a Service Group will be automatically assigned Description.SERVICE_GROUP_ID, a generated random unique ID.

In the GridServer Administration Tool, one can view and maintain Service Groups in the Service Group Admin page on the Services tab. The Service Group Admin page enables one to take actions on an entire group of Services at once, similar to the way one can act on Services on the Service Admin Page. For example, one could cancel a Service Group, which would cancel all of the Services within that Service group.

When the client cancels the Service instance, it only cancels the tasks submitted by that client. Preferably, the Service can only be cancelled by the admin page or interface. The Shared Service becomes inactive when the last client detaches from the Service. The Service will be closed if the SHARED_SERVICE_INACTIVITY_KEEP_ALIVE_TIME is 0 or not set. Also, when using Shared Services, Engine state is not maintained in failover, unless all Drivers that updated state are still running the instance.

Proxy Generation and Services as a Web Service Binding

Proxy Generation is the automatic generation of a client proxy class that mirrors the registered Service. This proxy generation mimics the WSDL proxy generation of a Web Service; the difference is that the proxy makes its calls via a Service object on a Driver, rather than using SOAP over HTTP.

Essentially, the Service can be thought of a binding to a virtualized Web Service that can process asynchronous requests in parallel. Additionally, because the proxy does not expose any vendor classes, it provides a standards-compliant approach to integrating applications in a vendor non-specific way.

The following rules apply to the generated proxy:

The use of the proxy class is completely independent of the vendor API. That is, client code that uses the proxy class does not need to import or reference any vendor classes.

If there is an initMethod, the proxy constructor takes any arguments to that method.

All service methods produce synchronous and asynchronous versions of the method on the proxy.

Each update method has a corresponding update method on the proxy.

Since the cancelMethod and destroyMethod are called implicitly, they do not generate methods on the proxy.

The targetPackage field indicates the package (in Java) or namespace (in .NET) in which the generated classes are placed. If not set, it is the name of the Service.

If xmlSerialization is used, classes are generated for all non-primitive types, which must be interop types. If not, they can be any serializable type, they are not generated, and the client must have access to those same classes (via a JAR/Assembly). The proxy is generated using the Service Registry on a Broker. The proxy is generated on an Engine, so an idle Engine must be available for the generation to succeed.

FIGS. 4A–C exemplify a Java generated proxy, and FIGS. 5A–C exemplify a .NET generated proxy.

Invocation Variables

While a Service implementation can be completely independent of vendor libraries, there are certain occasions on which one may need to interact with the GridServer environment on the Engine. This is accomplished via variables that are retrieved in various ways dependent on the type of Service:

| | |
|---|---|
| Java: | System properties; |
| DynamicLibrary: | Environment variables; |
| .NET: | System.AppDomain.CurrentDomain data values; |
| Command: | Environment variables, with the dots replaced with underscores. |

The following is a list of available variables:

| | |
|---|---|
| ds.ServiceInstanceID | The unique identifier for the Service instance being invoked. |
| ds.ServiceInvocationID | A number uniquely identifying the invocation (task) of the Service instance. |
| ds.ServiceCheckpointDir | The directory that the Service should use for reading and writing of checkpoint data, if checkpointing is enabled for the Service. |
| ds.ServiceInfo | If this variable is set in an invocation, the value will be displayed in the Task Admin upon completion of the invocation. |
| ds.WorkDir | The work directory for the Engine. This directory contains the log directory and the tmp directory. |
| ds.DataDir | The data directory for the Engine, which is the directory in which DDT data is stored. |

Distributed Web Services

A Web Service is a method of integrating Web-based applications that interact with other Web applications via open standards. Web Services use UDDI to discover available Services, and WSDL to describe those Services. This enables another Web Application to discover a Web Service and receive a WDSL description of its Services. Then it can send XML information with the SOAP protocol. The Web Application will then process the XML and return a response in XML via SOAP.

Typically, one would use the Distributed Web Service interface when the client cannot use one of the GridServer Drivers, such as if the client code is written in a language other than C++, Java, or .NET. Also, one may prefer to use this interface if one is already standardized on Web Services and already utilizing a rich SOAP client toolkit.

Distributed Web Services enable one to host and distribute Web Services utilizing GridServer. The Distributed Web Services interface provides a mechanism for a client to use a GridServer Broker to route web service requests to Engines for execution. The Broker acts as a virtual endpoint for SOAP RPC requests, and transparently routes these requests.

A Distributed Web Service is essentially a Service, accessed as a Web Service rather than with a Driver. The Service can be used by a client that is implemented in a language that has support for Web Services using SOAP over HTTP. Distributed Web Services also can be stateful, like Services, and support Service options.

Any registered Service is automatically exposed as a Distributed Web Service. For Java and .NET, arguments and return values must be interop types. For dynamic library and command Services, arguments must be ASCII strings; return types may be strings or byte arrays.

Service Routing

The Director has a DriverAdmin web service, which has a method called getServicesURL (String serviceName), which returns the URL of the Service on a Broker suitable for the Driver Profile associated with the user. This Broker is chosen in the same manner a Broker is chosen for a DataSynapse Driver.

Classic Web Service Functionality

The WSDL for this Service is obtained by using the Service Registry page in the GridServer Administration Tool, or at[service URL]?wsdl. The serviceURL can be obtained from the DriverManager web service on a Director.

A default Service instance is always available at the Service URL. Any methods designated as service methods in the binding can be run as RPCs. These calls will be executed on any available Engine.

In this way, the Distributed Web Service behaves just like any deployed Web Service, in that the Service provides WSDL and processes SOAP RPCs. The difference is that these RPCs are distributed to Engines and executed in parallel, rather than serially as in a typical Web Service provider.

Management of Service instances, state, and asynchronous submission/collection is also provided, and handled by the use of the SOAPAction attribute. The appropriate attribute, based on the container binding, is automatically attached to the corresponding operation in the WSDL.

Service Instance Creation/Destruction

The operation associated with the initMethod in the container binding is used to create a new Service instance. If the Service does not have an init method, a default create operation is added automatically. This instance is independent of the default instance and any other instance created by the DWS. The return value from the operation is the URL of this new DWS instance, and will be of the form [service URL]/[id], where id is the Service ID. For example (on a proxy generated in C#):

```
// create the ServiceCalculator
Service cs = new CalculatorService( );
// create a stateful Service instance by calling the
initMethod,
// and assign the URL to the new instance's URL.
cs.Url = cs.initMem(1.0);
```

A destroy operation is also added, which destroys the instance. If a destroyMethod is registered, the operation will be that method. Otherwise, a destroy operation is added.

Asynchronous Submission

Every method registered as a serviceMethod has an additional asynchronous operation created for it. The name is [method name]_Async, and the return value is the ID (string) of the invocation, which can be used for collection.

An additional operation is provided called collectAsync. This method takes a single ID (string) argument as its input. The operation returns two values. The first is an invocation result value, and the second is the ID of the invocation. If the ID is null, the next available invocation result value is returned; otherwise, the value for the provided ID is returned. The result of a collectAsync call can be one of five states:

The returned ID is non-null. In this case, the result value is the result for that ID.

The returned ID is null, but the result is the amount of time, in msecs, that the client should wait before polling again.

Both the ID and result are null. This means that there are no outstanding results to collect.

A SOAP Fault is returned, of type client. This means that a request failed. The SOAP Fault Actor is set to the ID, and the detail contains the exception.

A SOAP Fault is returned of the type Server. This means that the instance failed. The detail contains the exception.

Typically, the client would implement a collector thread that continually polls the collectAsync method to gather output data as it becomes available.

State Updates

Methods registered as state update calls are simply marked with the appropriate SOAPAction. The following SOAPActions are defined for Distributed Web Services:

| | |
|---|---|
| init | Indicates that this operation will create a new Service instance. The return value of the operation is the URL if the new instance. The name of the operation has no meaning. |
| destroy | Indicates that this operation will destroy the instance. If this instance is the default instance, a SOAPFault is generated. The name of the operation has no meaning. |
| appendState | Indicates that this operation is an append state operation. The operation name must match the method name. |
| setState | Indicates that this operation is a set state operation. The operation name must match the method name. |
| submit | Indicates that this operation is an asynchronous submission. The return value is the ID of the invocation. The name of the operation must be [method name]_Async. |
| collect | Indicates that this operation should collect the result of the given ID, or the next available if the given ID is null. The name of the operation has no meaning. |
| [no action] | Indicates that the operation is a synchronous operation. The operation name must match the method name. |

Tutorial Services Example

In this section, we will create a simple Service in Java. The Service class is called JavaAdder (FIG. 6) and has one method, add, that takes two doubles. The method returns a double that is the sum of its arguments.

Once the class is written and compiled, it must be deployed. This process is no different from deploying any other code with GridServer. Create a JAR file containing the necessary class file (JavaAdder.class) and place it in the resources/shared/jar area of the Manager. This can be accomplished through the GridServer Administration Tool, or manually by placing it on the GridServer Manager's file system. The Service must also be registered, as previously discussed.

Client-Side Code

Having deployed and registered the Service, we are now ready to use it. There are three different techniques we can use to access this Service from a client:

1. The Service API
2. GridServer-generated proxy
3. SOAP

First we will demonstrate accessing the Service using the Service API in Java. Only a few lines of code are needed to use the JavaAdder Service.

The first line gets an instance of the ServiceFactory class and calls its createService method to create a Service instance for the Service. If you try to create a Service whose name was not registered, createService will throw a GridServerException whose nested exception says "csdd not found."

Referring now to FIG. 7, the second line prepares the arguments to be submitted to the Service, two Doubles (note the use of the primitive wrapper object). The third line executes the add method with the given argument list and will block until the method completes and its return value makes its way back to the client. If the remote method throws an exception, or an error occurs in the course of processing the request, an exception is thrown. GridServerException may wrap another exception; one may use its getCause method to obtain the wrapped exception.

Asynchronous and Parallel Processing Requests

A client can use the submit method instead of the execute method of Service to perform a remote invocation without waiting for the result. This allows the caller to make many asynchronous requests in parallel—with these requests being executed in parallel if the resources are available to do so. In addition to the method name and argument, the submit method takes a callback object that implements the ServiceInvocationHandler interface. This interface has a handleResponse method that will be called with the method's return value in the event of a normal response, and a handleError method that is called if an error occurs. The submit method returns an integer that uniquely identifies the particular call; this unique ID is passed as the second argument to the ServiceInvocationHandler methods, so that one can match the response with the request if need be.

To use the submit method, one first needs a class implementing ServiceInvocationHandler. The handleResponse method (FIG. 8) displays the response and adds it to a total.

One can then invoke the Service using the submit method. This code (FIG. 9) first creates a ServiceInvocationHandler, and then it calls submit several times. In order to wait for all the responses to arrive, the call to waitUntilInactive causes the current thread to wait until all outstanding requests have finished. The argument is a timeout value in milliseconds; an argument of zero means wait indefinitely.

Using a GridServer-Generated Proxy

Using the Service API is easy and flexible, but there is a better way to access the Services one writes and deploys on GridServer. After registering the Service using the Administration Tool, there will be a menu action available for creating client-side access proxies in either Java or C#. There are several advantages to using proxies:

1. No manual coding required—the proxy code itself does the argument setting and return value casting, etc. It's a lot easier to use a class that looks like the Service.
2. Type-safe—Argument and return types are checked at compile-time, instead of on the Engine at runtime.
3. WSDL-Compliant and Vendor Neutral—Application code does not need to have compile-time dependency with any vendor-specific code or libraries if the proxies are used. The proxies themselves make use of vendor code, but do not expose this dependency to the customer application code. This proxy should be replacable with any other WebServices based approach, such as the wsdl.exe .NET proxy generator, or the Axis tool for Java.

As illustrated in FIG. 10, the add method may be invoked using a proxy object. Behind the scenes is the JavaAdderProxy code for the method add, as shown in FIG. 11.

To call this method asynchronously (possibly to have many requests done in parallel), one can create a callback class that implements an interface found in the proxy. An example callback interface defined in the proxy appears in FIG. 12. Instead of implementing the ServiceInvocationHandler class, one implements the JavaAdderProxy.Callback class. The benefit to this approach is that the code one writes for this callback does not have to import any vendor classes. All one needs to do is import the proxy and use it.

When using a GridServer-generated proxy, asynchronous calls are performed by invoking an overloaded method that has the same name and arguments as the synchronous version, but adds an additional argument for the callback. The proxy also has a waitUntilInactive method to pause the current thread until all outstanding asynchronous calls have completed. FIG. 13 shows an example.

Using SOAP to Access the Adder Service

FIG. 14 uses the Axis WSDL2Java tool to generate the SOAP-based proxies for accessing the Service. The resulting proxy class is called JavaAdderProxy, and the code sample demonstrates using it synchronously.

Since the transport is in HTTP, operations are added to the WSDL definition that make it easy to perform asynchronous, SOAP-based invocations. Every method in the class (or operation in the portType) has a commensurate method which ends in _async. For example, the doIt method also has a corresponding method called doIt_async. The latter method is used to submit the request; the return value is a reference ID that is used to collect the results later by calling the collectAsync method. FIG. 15 demonstrates submission of an asynchronous request. This example uses Axis SOAP tools to construct the SOAP messages, but any other SOAP-based approach in any language can be used to access Services deployed on GridServer.

Container Bindings and Service State

The GridServer technology allows Services to have state—per-client or global—that is preserved by the container and is consistent across all physical Service instances, that is, all Engine-side instantiations of a client-side Service instance. The latter concept is important to understand: since many GridServer Engines can perform Service requests in parallel, the Service deployer must inform GridServer which methods are stateful and which are stateless. This way, GridServer can ensure that the object's state is up-to-date prior to servicing the next request. In addition to state, the container must know which methods to expose as Service operations and which methods should be called for initialization and destruction of the Service implementations in memory.

Container-managed Lifecycle

Services hosted in the GridServer environment are virtualized—provisioned dynamically on Engines at the behest of the GridServer Manager to satisfy demand. In this model, Service initialization and destruction happens automatically, but proper start-up and clean-up operations can be performed on the Service by registering the right methods to call on the Service to accomplish these tasks. Consider, for example, a simple class (FIG. 16) that connects to a hypothetical database.

When a class is registered as a Service, it is possible to specify in the Container Bindings section of the registry page what methods are used for initialization and destruction of the Service. In this example (FIG. 16), initDBConnection would be specified as the "initMethod" and close would be specified in the "destroyMethod" field. Since initDBConnection takes two arguments, a Properties object and an int, the client-side proxy class (FIG. 17) would have a constructor with the same argument list.

Cancel Method

If a Service is canceled by the user or a Service request (Task) is canceled, the managing container receives a message and will call a specified operation on the Service automatically. For a given Service, a method can be assigned to be called by the container under this cancellation event. FIG. 18 shows an example.

In this example, the stop method should be registered as the "cancelMethod." If it is not possible to stop the operation in this way, GridServer allows cancelled Service operations to cause the entire Engine process to be killed and restarted automatically. The Service option is called "killCanceledTasks" and takes the value true or false.

Stateful Service Operations

The next example demonstrates how to manage state in the Service instances and how to instruct GridServer to behave properly under these operating conditions. FIG. 19 shows a bond calculator class that holds state. Both the addBonds and setBonds methods take a list of bond IDs. We assume that in these methods the actual object representations are constructed and the bond data is fetched from an appropriate source and loaded into the object representations. We further assume that there is a fair amount of latency and computation involved in these object constructions—this is why the writer of this Service is interested in keeping this stateful data present in the Service. There is also a stateless computing method that computes the valuations for these financial instruments under different market conditions or scenarios.

In this example, we see that there are two stateful methods—addBonds and setBonds. But their behavior is different: if addBonds is called, the new bonds will be added to the existing collection, while the setBonds method will replace the existing collection. One can capture this distinction and ensure proper behavior of the GridServer deployment by setting the appropriate fields in the ContainerBindings section of the Service Registry. There is a field called appendStateMethods that can be set to the value addBonds and a field called setStateMethods that can be set to the value setBonds. More than one method can be listed, separating them by commas.

Service requests can be made using a client-side proxy class generated by GridServer (FIG. 20) or using the service API (FIG. 21). However, if using the Service API, one will have to make the distinction in the API calls themselves. Note, for example, the use of the method updateState in FIG. 21. The last argument to the updateState method is a boolean that indicates whether this state should replace the current state (true) or append the current state (false).

What we claim is:

1. A method for providing computational services to a client using a grid-based distributed computing system, the system including a plurality of engines and at least one grid manager, the method comprising:
    deploying executable code corresponding one or more service(s) such that the engines can access the executable code;
    registering the service(s) with the grid manager;
    creating instance(s) of the service(s) invocable by the client; and,
    using one or more of the instance(s) to invoke one or more of the registered service(s), wherein invoking a service comprises:
    communicating a service request to the grid manager;
    using the grid manager to assign the service request to an available engine by (i) obtaining neediness score(s) for pending service request(s), each neediness score based on at least (a) an amount of time that engines have spent running task(s) associated with the requested service and (b) an amount of time that the request for the service has spent waiting to be assigned, (ii) obtaining affinity scores reflecting the affinity of available engine(s) to requested service(s), and (iii) applying an adaptive scheduling algorithm to assign the service request to one or more available engine(s); and,
    executing code corresponding to the requested service on at least one of the assigned engine(s).

2. A method for providing computational services to a client using a grid-based distributed computing system, as defined in claim 1, wherein the adaptive scheduling algorithm select(s) from available engine(s) based, at least in part, on one or more of the neediness score(s).

3. A method for providing computational services to a client using a grid-based distributed computing system, as defined in claim 1, wherein the adaptive scheduling algorithm select(s) from available engine(s) based, at least in part, on one or more of the affinity score(s).

4. A method for providing computational services to a client using a grid-based distributed computing system, as defined in claim 1, wherein the adaptive scheduling algorithm select(s) from available engine(s) based, at least in part, on one or more of the neediness score(s) and one or more of the affinity score(s).

5. A method for providing computational services to a client using a grid-based distributed computing system, as defined in claim 1, wherein the adaptive scheduling algorithm selectively supports redundant scheduling.

6. A method for providing computational services to a client using a grid-based distributed computing system, as defined in claim 1, wherein deploying executable code comprises storing executable code on a shared file system accessible to the engines.

7. A method for providing computational services to a client using a grid-based distributed computing system, as defined in claim 1, wherein deploying executable code comprises using a file update mechanism provided by the grid manager to distribute executable code to the engines.

8. A method for providing computational services to a client using a grid-based distributed computing system, as defined in claim 7, wherein using a file update mechanism to distribute the executable code to the engines comprises distributing executable code to the engines when the grid manager is idle.

9. A method for providing computational services to a client using a grid-based distributed computing system, as defined in claim 1, wherein creating an instance of a service comprises invoking a service creation method.

10. A method for providing computational services to a client using a grid-based distributed computing system, as defined in claim 1, wherein communicating a service request to the grid manager comprises invoking a synchronous invocation method.

11. A method for providing computational services to a client using a grid-based distributed computing system, as defined in claim 1, wherein communicating a service request to the grid manager comprises invoking an asynchronous invocation method.

12. A method for providing computational services to a client using a grid-based distributed computing system, as defined in claim 1, wherein communicating a service request to the grid manager comprises synchronously invoking a client-side proxy that corresponds to the service.

13. A method for providing computational services to a client using a grid-based distributed computing system, as defined in claim 1, wherein communicating a service request to the grid manager comprises asynchronously invoking a client-side proxy that corresponds to the service.

14. A method for providing computational services to a client using a grid-based distributed computing system, as defined in claim 1, wherein communicating a service request to the grid manager comprises communicating a synchronous service request via a client-side Web Services Description Language (wsdl) proxy.

15. A method for providing computational services to a client using a grid-based distributed computing system, as defined in claim 1, wherein communicating a service request to the grid manager comprises communicating an asynchronous service request via a client-side wsdl proxy.

16. A method for providing computational services to a client using a grid-based distributed computing system, as defined in claim 1, further comprising providing a fail-over grid manager.

17. A method for providing computational services to a client using a grid-based distributed computing system, as defined in claim 1, wherein each affinity score is computed, at least in part, from information representing the amount of the requested service's state that is already present on the engine-in-question.

18. A method for providing computational services to a client using a grid-based distributed computing system, as defined in claim 1, wherein requested service(s) are first ranked according to neediness score(s), then assigned to engine(s) according to affinity score(s).

19. A method for providing computational services to a client using a grid-based distributed computing system, the system including a plurality of engines and at least one grid manager, the method comprising:
  registering service(s) with the grid manager;
  deploying executable code(s) corresponding to the registered service(s) using a file update mechanism to distribute the executable code(s) to the engines, wherein at least some of said executable codes(s) are distributed while the grid manager is idle;
  creating instance(s) of the service(s) that permit invocation by client(s); and,
  using one or more of the instance(s) to invoke one or more of the registered service(s), wherein invoking a service comprises:
  communicating a service request to the grid manager;
  using the grid manager to assign the service request to an available engine by (1) computing a neediness score for the service request based, at least in part, on (i) a priority weight for the requested service, (ii) an amount of time that engines have spent running task(s) associated with the requested service, and (iii) an amount of time that the request for the service has spent waiting to be assigned, and (2) applying an adaptive scheduling algorithm to assign the service request to one or more available engine(s); and,
  executing code(s) corresponding to the requested service on at least one of the assigned engine(s).

20. A method for providing computational services to a client using a grid-based distributed computing system, as defined in claim 19, wherein the adaptive scheduling algorithm selectively supports redundant scheduling.

21. A method for providing computational services to a client using a grid-based distributed computing system, as defined in claim 19, further comprising deploying executable code corresponding to the registered service(s) on a shared file system accessible to the engines.

22. A method for providing computational services to a client using a grid-based distributed computing system, as defined in claim 19, wherein said deploying of executable code occurs when the grid manager is idle.

23. A method for providing computational services to a client using a grid-based distributed computing system, as defined in claim 19, wherein communicating a service request to the grid manager comprises synchronously invoking a client-side proxy that corresponds to the service.

24. A method for providing computational services to a client using a grid-based distributed computing system, as defined in claim 19, wherein communicating a service request to the grid manager comprises asynchronously invoking a client-side proxy that corresponds to the service.

25. A method for providing computational services to a client using a grid-based distributed computing system, as defined in claim 19, wherein communicating a service request to the grid manager comprises communicating a synchronous service request via a client-side wsdl proxy.

26. A method for providing computational services to a client using a grid-based distributed computing system, as defined in claim 19, wherein communicating a service request to the grid manager comprises communicating an asynchronous service request via a client-side wsdl proxy.

27. A method for providing computational services to a client using a grid-based distributed computing system, as defined in claim 19, wherein requested service(s) are first ranked according to neediness score(s), then assigned to engine(s) according to affinity score(s).

28. A method for providing computational services to a client using a grid-based distributed computing system, the system including a plurality of engines and at least one grid manager, the method comprising:
  obtaining executable code corresponding one or more service(s);
  registering the service(s);
  providing client-side proxy(s) for the registered service(s); and,
  using one or more of the proxy(s) to invoke one or more of the registered service(s), wherein invoking a service comprises:
  communicating a service request via a corresponding client-side proxy;
  assigning the service request to at least one available engine by (i) obtaining a neediness score for the service request, said neediness score based on at least (a) an amount of time that engines have spent running task(s) associated with the service and (b) an amount of time that the request for the service has spent waiting to be assigned, (ii) obtaining affinity scores reflecting the affinity of available engine(s) to the requested service, and (iii) applying an adaptive scheduling algorithm to assign the service request to one or more available engine(s); and,
  servicing the request on at least one of the assigned engine(s).

29. A method for providing computational services to a client using a grid-based distributed computing system, as defined in claim 28, wherein the service request is assigned based, at least in part, on the neediness score and one or more of the affinity score(s).

30. A method for providing computational services to a client using a grid-based distributed computing system, as defined in claim 28, wherein the executable code is obtained from a shared file system accessible to the engines.

31. A method for providing computational services to a client using a grid-based distributed computing system, as defined in claim 28, wherein communicating a service request comprises invoking a synchronous invocation method.

32. A method for providing computational services to a client using a grid-based distributed computing system, as defined in claim 28, wherein communicating a service request comprises invoking an asynchronous invocation method.

33. A method for providing computational services to a client using a grid-based distributed computing system, as defined in claim 28, wherein communicating a service request comprises communicating a synchronous service request via a client-side wsdl proxy.

34. A method for providing computational services to a client using a grid-based distributed computing system, as defined in claim 28, wherein communicating a service request comprises communicating an asynchronous service request via a client-side wsdl proxy.

* * * * *